US011164200B1

(12) United States Patent
Curtis et al.

(10) Patent No.: US 11,164,200 B1
(45) Date of Patent: Nov. 2, 2021

(54) SYSTEM AND METHOD FOR PROVIDING IN-GAME OFFERS

(71) Applicant: KABAM, INC., San Francisco, CA (US)

(72) Inventors: Matthew Curtis, Novato, CA (US); Kellen Christopher Smalley, Pleasanton, CA (US); Christopher Pitz, San Francisco, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 1087 days.

(21) Appl. No.: 13/957,381

(22) Filed: Aug. 1, 2013

(51) Int. Cl.
G06Q 30/02 (2012.01)

(52) U.S. Cl.
CPC ............... *G06Q 30/0209* (2013.01)

(58) Field of Classification Search
None
See application file for complete search history.

(56) References Cited

U.S. PATENT DOCUMENTS

| | | | |
|---|---|---|---|
| 5,933,813 A | 8/1999 | Teicher et al. | 705/26 |
| 5,964,660 A | 10/1999 | James et al. | 463/1 |
| 6,748,365 B1 | 6/2004 | Quinlan | |
| 6,850,900 B1 | 2/2005 | Hare | |
| 6,928,474 B2 | 8/2005 | Venkatesan | 709/224 |
| 7,076,453 B2 | 7/2006 | Jammes et al. | 705/26 |
| 7,533,336 B2 | 5/2009 | Jaffe et al. | 715/243 |
| 7,660,740 B2 | 2/2010 | Boone et al. | 705/26 |
| 7,682,239 B2 | 3/2010 | Friedman et al. | 463/16 |
| 8,016,668 B2 | 9/2011 | Hardy et al. | 463/29 |
| 8,050,976 B2 | 11/2011 | Staib | |
| 8,157,635 B2 | 4/2012 | Hardy et al. | 463/17 |
| 8,187,101 B2 | 5/2012 | Herrmann et al. | 463/42 |
| 8,221,223 B2 | 7/2012 | Walker | |
| 8,226,472 B2 | 7/2012 | Van Luchene | 463/25 |
| 8,272,956 B2 | 9/2012 | Kelly et al. | 463/31 |
| 8,282,491 B2 | 10/2012 | Auterio et al. | 463/42 |
| 8,287,383 B1 | 10/2012 | Etter et al. | 463/42 |
| 8,287,384 B2 | 10/2012 | Auterio et al. | 463/42 |
| 8,292,743 B1 | 10/2012 | Etter et al. | 463/42 |

(Continued)

OTHER PUBLICATIONS

Lehdonvirta, Vili . "Virtual item sales as a revenue model: identifying attributes that drive purchase decisions". Springer Science + Business Media [online], Mar. 10, 2009 .[retrieved on: Aug. 18, 2021 ]. Retrieved from the Internet: < URL: https://link.springer.com/content/pdf/10.1007/s10660-009-9028-2.pdf> p. 101.*

(Continued)

*Primary Examiner* — Hajime Rojas
*Assistant Examiner* — Alfred H Tsui
(74) *Attorney, Agent, or Firm* — Esplin & Associates, PC

(57) ABSTRACT

A system and method are disclosed for providing an in-game offer to one or more users of an online game. The offer is provided to users that have parameters and/or characteristics meeting administrator defined parameters and/or characteristics. In some implementations, the offer may be meant to incentivize purchase of the offer by providing one or more bonus items upon the offer being selected by the player. Both the offer and the bonus may be presented to the user prior to selection of the offer. The offer and the bonus item may only be available to the user for a defined period of time.

10 Claims, 3 Drawing Sheets

(56) References Cited

U.S. PATENT DOCUMENTS

| | | | |
|---|---|---|---|
| 8,332,260 B1 | 12/2012 | Mysen et al. ............... 705/7.35 |
| 8,348,767 B2 | 1/2013 | Mahajan et al. ............... 463/42 |
| 8,360,858 B2 | 1/2013 | LaRocca et al. ............... 463/25 |
| 8,360,867 B2 | 1/2013 | Van Luchene ............... 463/25 |
| 8,366,544 B2 | 2/2013 | Walker et al. ............... 463/29 |
| 8,401,913 B2 | 3/2013 | Alivandi ............... 705/26.1 |
| 8,777,754 B1* | 7/2014 | Santini ............... G07F 17/32 463/42 |
| 8,920,243 B1 | 12/2014 | Curtis et al. ............... 463/42 |
| 9,138,639 B1 | 9/2015 | Ernst |
| 9,345,974 B1 | 5/2016 | Santini |
| 9,737,819 B2 | 8/2017 | Desanti |
| 10,357,720 B2 | 7/2019 | Curtis |
| 2002/0059397 A1 | 5/2002 | Feola |
| 2002/0095327 A1 | 7/2002 | Zumel et al. ............... 705/10 |
| 2003/0032476 A1 | 2/2003 | Walker et al. ............... 463/25 |
| 2003/0102625 A1 | 6/2003 | Katz et al. ............... 273/138.1 |
| 2004/0068451 A1 | 4/2004 | Lenk et al. ............... 705/28 |
| 2004/0215524 A1 | 10/2004 | Parkyn ............... 705/26 |
| 2004/0267611 A1 | 12/2004 | Hoerenz ............... 705/14 |
| 2005/0114223 A1 | 5/2005 | Schneider ............... 705/26 |
| 2005/0165686 A1 | 7/2005 | Zack |
| 2006/0200370 A1 | 9/2006 | Ratliff |
| 2008/0032787 A1 | 2/2008 | Low et al. ............... 463/29 |
| 2008/0154798 A1 | 6/2008 | Valz ............... 705/400 |
| 2008/0207327 A1* | 8/2008 | Van Luchene ............ A63F 13/12 463/42 |
| 2008/0234043 A1 | 9/2008 | McCaskey et al. ............... 463/29 |
| 2008/0275786 A1 | 11/2008 | Gluck ............... 705/14 |
| 2009/0011812 A1 | 1/2009 | Katz et al. ............... 463/16 |
| 2009/0017886 A1 | 1/2009 | McGucken ............... 463/1 |
| 2009/0204907 A1 | 8/2009 | Finn et al. ............... 715/757 |
| 2009/0210301 A1 | 8/2009 | Porter et al. ............... 705/14 |
| 2009/0234710 A1 | 9/2009 | Belgaied Hassine et al. . 705/10 |
| 2010/0035689 A1 | 2/2010 | Altshuler |
| 2010/0050088 A1 | 2/2010 | Neustaedter et al. ............... 715/745 |
| 2010/0094841 A1 | 4/2010 | Bardwil ............... 707/705 |
| 2010/0174593 A1 | 7/2010 | Cao et al. ............... 705/14.12 |
| 2010/0198653 A1 | 8/2010 | Bromenshenkel et al. .... 705/10 |
| 2010/0228606 A1 | 9/2010 | Walker et al. ............... 705/10 |
| 2010/0241491 A1 | 9/2010 | Eglen et al. ............... 705/10 |
| 2010/0241492 A1 | 9/2010 | Eglen et al. ............... 705/10 |
| 2011/0092273 A1 | 4/2011 | Cerbini ............... 463/25 |
| 2011/0113353 A1 | 5/2011 | Koh et al. ............... 715/760 |
| 2011/0145040 A1 | 6/2011 | Zahn et al. ............... 705/7.33 |
| 2011/0300923 A1 | 12/2011 | Van Luchene ............... 463/25 |
| 2012/0011002 A1 | 1/2012 | Crowe et al. ............... 705/14.66 |
| 2012/0040743 A1 | 2/2012 | Auterio et al. ............... 463/25 |
| 2012/0040761 A1 | 2/2012 | Auterio et al. ............... 463/42 |
| 2012/0042282 A1 | 2/2012 | Wong ............... 715/811 |
| 2012/0047002 A1 | 2/2012 | Patel |
| 2012/0059730 A1 | 3/2012 | Jensen |
| 2012/0101886 A1* | 4/2012 | Subramanian ..... G06Q 30/0611 705/14.23 |
| 2012/0109785 A1 | 5/2012 | Karlsson ............... 705/27.1 |
| 2012/0130856 A1 | 5/2012 | Petri |
| 2012/0142429 A1 | 6/2012 | Muller ............... 463/42 |
| 2012/0166380 A1 | 6/2012 | Sridharan et al. ............... 706/52 |
| 2012/0178529 A1 | 7/2012 | Collard et al. ............... 463/31 |
| 2012/0197874 A1 | 8/2012 | Zatkin et al. ............... 707/722 |
| 2012/0203669 A1 | 8/2012 | Borsch et al. ............... 705/27.1 |
| 2012/0215667 A1 | 8/2012 | Ganz et al. ............... 705/27.2 |
| 2012/0221430 A1 | 8/2012 | Naghmouchi et al. ...... 705/26.7 |
| 2012/0231891 A1 | 9/2012 | Watkins, Jr. et al. ........... 463/43 |
| 2012/0245988 A1 | 9/2012 | Pace et al. ............... 705/14.25 |
| 2012/0289315 A1 | 11/2012 | Van Luchene ............... 463/25 |
| 2012/0289330 A1 | 11/2012 | Leydon et al. ............... 463/31 |
| 2012/0289346 A1 | 11/2012 | Van Luchene ............... 463/42 |
| 2012/0295699 A1 | 11/2012 | Reiche ............... 463/25 |
| 2012/0296716 A1 | 11/2012 | Barbeau et al. ............... 705/14.13 |
| 2012/0309504 A1 | 12/2012 | Isozaki ............... 463/25 |
| 2012/0330785 A1 | 12/2012 | Hamick et al. ............... 705/26.41 |
| 2013/0005466 A1 | 1/2013 | Mahajan |
| 2013/0006736 A1 | 1/2013 | Bethke et al. ............... 705/14.12 |
| 2013/0012304 A1 | 1/2013 | Cartwright ............... 463/25 |
| 2013/0013459 A1 | 1/2013 | Kerr et al. ............... 705/27.1 |
| 2013/0090173 A1 | 4/2013 | Kislyi ............... 463/43 |
| 2013/0124361 A1 | 5/2013 | Bryson |
| 2013/0226733 A1 | 8/2013 | Evans |
| 2013/0281194 A1* | 10/2013 | Johnson ............ G07F 17/3227 463/25 |
| 2014/0033262 A1 | 1/2014 | Anders |
| 2014/0067526 A1 | 3/2014 | Raju |
| 2014/0067544 A1 | 3/2014 | Klish et al. ............... 705/14.66 |
| 2014/0073420 A1* | 3/2014 | Matthew ............... G06Q 30/02 463/29 |
| 2014/0087882 A1 | 3/2014 | Matsumoto |
| 2014/0089048 A1 | 3/2014 | Bruich ............... 705/7.32 |
| 2014/0100020 A1 | 4/2014 | Carroll |
| 2014/0157314 A1 | 6/2014 | Roberts |
| 2014/0243072 A1 | 8/2014 | Santini et al. ............... 463/20 |
| 2014/0337259 A1 | 11/2014 | Lamb |
| 2015/0019349 A1 | 1/2015 | Milley |
| 2015/0031442 A1 | 1/2015 | Colvin |
| 2019/0220897 A1 | 7/2019 | Caldarone |

OTHER PUBLICATIONS

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011 ,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshot access date May 24, 2012 2:19 PM, 1 page.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A-Little_Extra_Never_Hurts_--_Part_1&oldid=399597, http://lotro-wiki.com/index.php?title=Quest:A-Little_Extra_Never_Hurts_--_Part_2&oldid=399366, http://lotro-wiki.com/index.php?title=Getting_Started&oldid=349681, Links are to used articles, 33 pages.

Gaia "Black Friday Bundle" available on Nov. 23, 2011, from http://www.gaiaonline.com/forum/community-announcements/black-friday-big-bundles-rare-items/t.76127933/, 5 pages.

(56) References Cited

OTHER PUBLICATIONS

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

"Behavioural Analytics & Campaigning", http://lotaris.com/behavioural_analytics_and_Compaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash_of_Clans>, 3 pages.

"Gem calculation formulas". forum.supercell.net. Online. Accessed via the Internet. Accessed Aug. 9, 2014. <URL: http://forum.supercell.net/showthread.php/23028-Gem-calculation-formulas>, 3 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Aeria Games GmbH, "First Time Buyer—August", Aug. 10, 2010, <http://grandfantasia.aeriagames.com/news/5600/first-time-buyeraugust> (2 pgs).

Lotro-Wiki.com, "Hunting Lodge (Archet)" with "Introduction Quest", Aug. 14, 2012, https://lotrouwiki.com/index.php?title=Hunting_Lodge_(Archet)&oldid=495361 and <https://lotrowiki.com/index.php?title=Introduction_Quests&oldid=358308> (6 pages).

"Mystery Box." The Simpsons: Tapped Out Wiki, Apr. 20, 2013, web.archive.org/web/20130420013938/simpsonstappedout.wikia.com/wiki/Mystery_Box. (1 page).

Hamari, Juho, "game design as marketing: How game mechanics create demand for virtual goods" ( https://papers.ssrn.com/sol3/papers.cfm?abstract_id=1443907&download=yes)(Aug. 21, 2009) p. 5-7 as Hamari (Year: 2009).

\* cited by examiner

SYSTEM AND METHOD FOR PROVIDING IN-GAME OFFERS

FIELD OF THE DISCLOSURE

The disclosure relates to providing an in-game offer to players of a game based on one or more player parameters.

BACKGROUND

Various techniques for providing offers to players of an online game are known. For example, the provision of progressive offers to a player of an online game is known. Further, the provision of an offer based on a status of a player playing the game or based on a trigger in the game is also known. The automatic provision of offers to purchase the online game during a trial period is also known. Conventional systems, however, suffer from various drawbacks and inefficiencies relating to providing progressive, timed offers to a player based on the player's parameters within the game.

In current systems, determining cohorts of eligible users for incentives, and providing those incentives to the users within the cohorts may be manually performed.

SUMMARY

One aspect of the disclosure relates to providing an in-game offer to one or more players of an online game based on one or more player parameters. The offer may comprise an opportunity to purchase one or more virtual items and may also be combined with a bonus to incentivize the user to accept the offer and make the purchase. The offer, and the associated bonus, may be provided to players meeting one or more characteristics. For example, players of a game may have user parameters, such as time since their last purchase of virtual currency, or the amount of virtual currency purchased, which exceed, or fall below, an administrator defined threshold. Offers may be provided to users based on the user's spend behavior in the game, the user's behavior in the game, one or more characteristics of the user, and/or other characteristics of the user, and as such, the offers provided to the users may be provided automatically on a user-by-user basis. The offers provided to users on a user-by-user basis may be provided for a limited time. Upon expiration of the limited time offer, the offer may be replaced by a second offer.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The system configured to provide an in-game offer to one or more players of an online game may include one or more processors. The processor(s) may be configured to execute one or more computer program modules to provide an in-game offer to one or more players of an online game. The computer program modules may include one or more of a space module, a user account module, a parameter selection module, an offer selection module, a bonus selection module, an offer presentation module, and/or an offer distribution module. The processor(s) may be at the same location or may be at different locations. In some implementations, the client computing platforms may be configured to execute one or more computer program modules that are the same as or similar to the computer program modules of the server(s) to provide an in-game offer to one or more players of an online game.

The space module may be configured to execute an instance of a virtual space. The space module may be configured to implement the instance of the virtual space to facilitate presentation of a view of the virtual space to users. The space module may be configured to facilitate interaction of the users with the virtual space and/or each other by performing operations in the virtual space in response to commands received from the users. The space module may be configured to implement the instance of the virtual space to determine view information that defines a view of the virtual space for presentation to a first user. The space module may be configured to facilitate transmission of the view information to a client computing platform associated with the first user to facilitate presentation of the view of the virtual space to the first user on the client computing platform.

The user account module may be configured to manage accounts of users. The accounts of users may include a first user account associated with a first user. The first user account may include an indication of one or more of a purchase history of the first user indicating purchases of virtual currency by the first user, a spend history of the first user indicating purchases using virtual currency by the first user, a first set of game parameters for first user, a first set of user parameters for the first user, or other parameters associated with the first user.

The parameter selection module may be configured to facilitate selection and/or entry by an administrator of one or more thresholds associated with one or more of a purchase history of the first user indicating purchases of virtual currency by the first user, a spend history of the first user indicating purchases using virtual currency by the first user, a first set of game parameters for first user, or a first set of user parameters for the first user. The parameter selection module may be configured to facilitate entry and/or selection of one or more administrator defined parameters indicating a lower threshold for the amount of virtual currency purchased by the first user. The parameter selection module may be configured to facilitate entry and/or selection of one or more administrator defined parameters indicating an upper threshold for a period of time since the first user purchased virtual currency. The parameter selection module may be configured to facilitate entry and/or selection of one or more administrator defined parameters indicating an upper threshold for a period of time since the first user spent virtual currency. The parameter selection module may be configured to facilitate entry and/or selection of one or more administrator defined parameters indicating an upper threshold for an amount of consideration having a value outside of the virtual space exchanged for virtual currency. The parameter selection module may be configured to facilitate entry and/or selection of one or more administrator defined parameters indicating a threshold for the one or more game parameters of the first set of game parameters.

In some implementations, the first set of user parameters for the user may include user demographics. The one or more administrator defined parameters may include an indication that the user falls within specified ranges of individual ones of the user demographics. User demographics may include gender, age, location, weather, or any other identifying parameter for the user. One or more of the administrator defined parameters may comprise one or more user demographic information. In response to the first user having a first set of user parameters including user demographics corresponding to the one of more of the user demographic information included in the one or more administrator defined parameters. For example, the one or more administrator defined parameters may include an administrator defined location. The first user may have a first set of user parameters indicating that the first user is at the defined location.

The offer selection module may be configured to select a first offer from a set of offers to present to the first user based upon one or more of the purchase history of the first user, the spend history of the first user, the first set of game parameters for the first user, or the first set of user parameters for the first user, wherein the first offer comprises an opportunity to purchase a first set of items. The first set of items may include virtual items usable in the virtual space, virtual currency, or other items available for purchase by the first user. In some implementations, the one or more items included in the offer may be items available for purchase by any user in the game. For example, the items may be items in a virtual marketplace or a virtual store associated with the game. In some implementations, the one or more items included in the offer may be a subset of items available for purchase in the game. For example, the first user may only receive an offer to purchase one or more items at a specific price point, geared towards a specific goal, related to a specific subject matter, and/or one or more items otherwise grouped.

In some implementations, the offer selection module may segment players based on one or more player parameters, and may generate a plurality of offers and a plurality of bonuses for a respective segment of players. For example, the offer selection module may obtain values of respective player parameters for the players of the game. The offer selection module may form at least a first segment of players based on a value of a first parameter. The offer selection module may generate a plurality of offers and a plurality of bonuses for the first segment. A first offer of the plurality of offers may comprise an opportunity to purchase a first set of items, where a second offer may comprise an opportunity to purchase a second set of items different from the first set. A first bonus may comprise a first set of bonus items provided to the player responsive to the player accepting the first offer, and a second bonus may comprise a second set of bonus items different from the first set of bonus items.

The bonus selection module may be configured to select a first bonus item from a set of bonus items to present to the first user with the first offer, wherein the first bonus item is usable in the virtual world. The first bonus item may include one or more items desirable to the first user to incentivize the first user to accept the first offer. The first bonus item may be one or more virtual items usable in the virtual space, virtual currency, a discount to the user cost associated with one or more items of the first offer, a desirable increase to one or more parameters of the user's in-game character, access to quests not normally available to the first user having parameters associated with the first user, or other item desirable to the first user. In some implementations, a first offer may comprise an opportunity to purchase one or more items and a first bonus may comprise at least one bonus item that may be provided to the first user responsive to the user purchasing the one or more offered items. In some implementations, a bonus may be associated with one or more specific offers, with any of the offers available, and/or with another grouping of offers. The one or more items included in the bonus may be items available in a virtual marketplace or virtual store associated with the game, items unavailable in the marketplace, a mix of unavailable and available items, and/or other items.

In some implementations, the offer selection module may provide a bonus to the user along with the provision of an offer, but may not reveal to the user the items in the bonus. In some implementations, the offer selection module may reveal one or more of: the items in the bonus, a value in the game of each item in the bonus, a value in the game of the bonus as a whole, an availability of each item in the bonus in the game, and/or other information relating to the bonus. In some implementations, the offer selection module may reveal more information relating to the bonus as a time during which the offer and bonus are made available to the user decreases.

The first offer may comprise a user cost associated with the first set of items, wherein the user cost associated with the first set of items is independent from the first bonus item. In some implementations the first set of items may consist of a single virtual item.

The offer presentation module may be configured to facilitate presentation of the first offer and the first bonus item to the first user, responsive to an indication that one or more of the purchase history of the first user, the spend history of the first user, or the first set of game parameters for the first user meets one or more of administrator defined parameters. An indication of the first offer may be provided to the first user. The indication of the first offer may be presented to the first user as a banner, pop-up window, or other indication, in the presentation of the view of the virtual space to the first user. In some implementations, an indication of the first offer may be provided to the first user in a game shop interface presented to the first user upon an interaction by the first user with the virtual space and/or the interface through which the user interacts with the virtual space. Other examples of the way in which the first user may receive an indication of the first offer may include, without limitation, electronic mail, notification through one or more electronic social networking sites affiliated with the first user, or other indications of the first offer.

The offer presentation module may be configured to present offers to the first user in response to a determination that the first user is at the defined location specified by the administrator. The offer presentation module may be further configured to provide such offers during a specified time, for example during a time period where peak gaming activity occurs for that location.

In some implementations an indication that the first offer has an associated bonus may be provided to the first user along with the presentation of the first offer. In other implementations the bonus associated with the first offer may be revealed to the first user after the first user has purchased the first offer.

An administrator may have selected and/or entered an administrator defined parameter providing a lower threshold for the amount of virtual currency purchased by the first user for use in the virtual space. The administrator defined parameter may provide a lower threshold for the amount of virtual currency purchased by the first user over a defined period of time. The purchase history of the first user may provide an indication that the user has purchased less virtual currency over a defined period of time than the lower threshold. In response to a determination that the purchase history of the first user indicates that the user has purchased less than the lower threshold, the offer presentation module may present a first offer to the first user. Providing an offer to users who have purchased less than a lower threshold of virtual currency may incentivize those users to purchase virtual currency, thereby increasing the revenue generated from those users.

The one or more administrator defined parameters may include an upper threshold for the period of time since the first user purchased virtual currency. The purchase history of the first user may provide an indication that the user has not purchased virtual currency for the threshold period of time and in response, the offer presentation module may present a first offer to the first user. Providing an offer to users who have not purchased virtual currency for a defined period of time may incentivize them to purchase virtual currency, increasing the revenue generated from those users.

The user account for the first user may comprise a first inventory for the first user providing an indication of the virtual items obtained by the first user in the virtual space. The inventory may provide an indication of the amount of virtual currency held in credit for the first user to spend in the virtual world. The inventory may provide an indication that the user has above a threshold amount of virtual currency held in credit. The spend history of the first user may provide an indication of the expenditures of virtual currency within the virtual space. Where the spend history of the first user indicates that the first user has not spent virtual currency for a defined period of time, and where the inventory for the first user provides an indication that the user has above a threshold amount of virtual currency held in credit for the first user, the offer presentation module may provide a first offer to the first user. Providing offers to users who have an amount of virtual currency held in credit but remaining unspent may incentivize those users to spend their virtual currency. By spending their virtual currency on the offer, the users deplete their resources allowing them to incentivized to purchase additional sums of virtual currency at a later date, thereby increasing the revenue generated from such users.

The one or more administrator defined parameters may comprise an upper threshold for the total amount of virtual currency obtained by the first user. The purchase history of the first user may indicate that the first user has obtained an amount of virtual currency above the upper threshold. In response to a determination that the first user has obtained an amount of virtual currency above the upper threshold, the offer presentation module may be configured to present the first offer to the first user. Users who have purchased a relatively large amount of virtual currency compared to other users may be more likely to continue making purchases of virtual currency. By presenting offers to such users it may incentivize them to make further purchases of virtual currency and/or make purchases with virtual currency incentivizing them to replenish their virtual currency resources, thereby increasing the revenue generated from such users.

In some implementation, the first offer may have an associated time period during which the first offer is available to the first user. After expiration of the associated time period the first offer may no longer be available for selection and/or entry by the first user. The first user may be presented with no offer, or may be presented with a second offer. The second offer may have an associated time period during which the second offer is available to the first user. The second offer may be associated with the same and/or different parameters for the first user, than those associated with the first offer.

The offer distribution module may be configured to provide the first set of items associated with the first offer and the first bonus item to the first user, responsive to the first user selecting the first offer. Responsive to the first user selecting the first offer, the offer distribution module may be configured to update the user inventory associated with the first user to indicate that the user has the first set of items and/or the first bonus item in the inventory associated with the first user. The offer distribution module may be configured to provide the first set of items associated with the first offer and the first bonus item to the first user, responsive to the first user selecting the first offer and responsive to an indication that the first user has an amount of virtual currency the same as or in excess of the user cost associated with the first offer.

The offer presentation module may track the responses of the users of the first segment to the individual offers and bonuses provided to the respective players. In some implementations, a first subset of players of the first segment may have been provided the first offer and the first bonus, while a second subset of players of the first segment may have been provided the first offer and the second bonus. In these implementations, the offer presentation module may track the responses of the one or more players of the first subset to the first offer and the first bonus and the responses of one or more players of the second subset to the first offer and the second bonus. In some of these implementations, the offer presentation module may assess a relative effectiveness of the offers and bonuses transmitted to the first segment based on the responses of the players of the first segment. The assessment may include determining whether the provision of the first offer and the first bonus or the provision of the first offer and the second bonus is more effective for the first segment of players. In some implementations, the first subset may receive a first offer and a first bonus, while the second subset may receive a second offer and a second bonus.

In some implementations, the offer selection module may be configured to select a second offer and a second bonus to provide to the player responsive to the player not accepting the first offer.

The offer presentation module may be configured to provide a first offer and a first bonus to a player responsive to the player selection module determining that the player qualifies for an offer (e.g., the player is one or both of: a new player or a player that has not engaged in any purchases in the online game). The offer presentation module may make the offer available to the player for a specific amount of time. For example, the offer presentation module may make the offer available to the player for a predetermined amount of time, for an amount of time based on one or more characteristics of the player as obtained from a profile associated with the player, for an amount of time determined based on results of split testing of time frames for making available an offer and a bonus, and/or for other periods of time. In some implementations, a combination of an offer and a bonus may be associated with a respective predetermined amount of time.

In some implementations, responsive to the player not accepting the first offer, the offer presentation module may make available the plurality of available offers to the player. In some of these implementations, the offer presentation module may make the offers available to the player, but may not make any bonuses available to the player. In some implementations, responsive to the player not accepting the first offer, the offer presentation module may provide a second offer and a second bonus to the player. The offer presentation module may make the second offer and the second bonus available to the player for a predetermined amount of time, for an amount of time based on one or more characteristics of the player as obtained from a profile associated with the player, for an amount of time determined based on results of split testing time frames for making available a second offer and a second bonus, and/or for other periods of time. In some implementations, responsive to the player not accepting the first offer and not accepting the second offer, the offer presentation module may make available the plurality of available offers to the player. In some of these implementations, the offer presentation module may make the offers available to the player, but may not make any bonuses available to the player.

In some implementation, a computer-implemented method of providing an in-game offer to one or more players of an online game may be implemented in a computer system comprising one or more physical processors. The method may comprise executing an instance of a virtual space and implementing the instance of the virtual space to facilitate presentation of a view of the virtual space to users. Accounts of users may be managed, wherein the accounts of the users may include a first user account associated with a first user. The first user account may indicate one or more of a purchase history of the first user indicating purchases of virtual currency by the first user, a spend history of the first user indicating purchases using virtual currency by the first user, a first set of game parameters for first user, or a first set of user parameters for the first user. A first offer from a set of offers may be selected to present to the first user based upon one or more of the purchase history of the first user, the spend history of the first user, the first set of game parameters for the first user, or the first set of user parameters for the first user, wherein the first offer comprises an opportunity to purchase a first set of items. A first bonus item may be selected from a set of bonus items to present to the first user with the first offer, wherein the first bonus item is usable in the virtual world. The first offer and the first bonus item may be presented to the first user, responsive to an indication that one or more of the purchase history of the first user, the spend history of the first user, or the first set of game parameters for the first user meets one or more administrator defined parameters. The first bonus item may be provided to the first user, responsive to the first user selecting the first offer.

In some implementations an electronic storage media may store information related to providing an in-game offer to one or more players of an online game. The stored information may comprise a memory configured to store information related to the one or more players of an online game, and instructions to execute an instance of a virtual space; implement the instance of the virtual space to effectuate presentation of views of the virtual space to the one or more players by the one or more client computing platforms.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
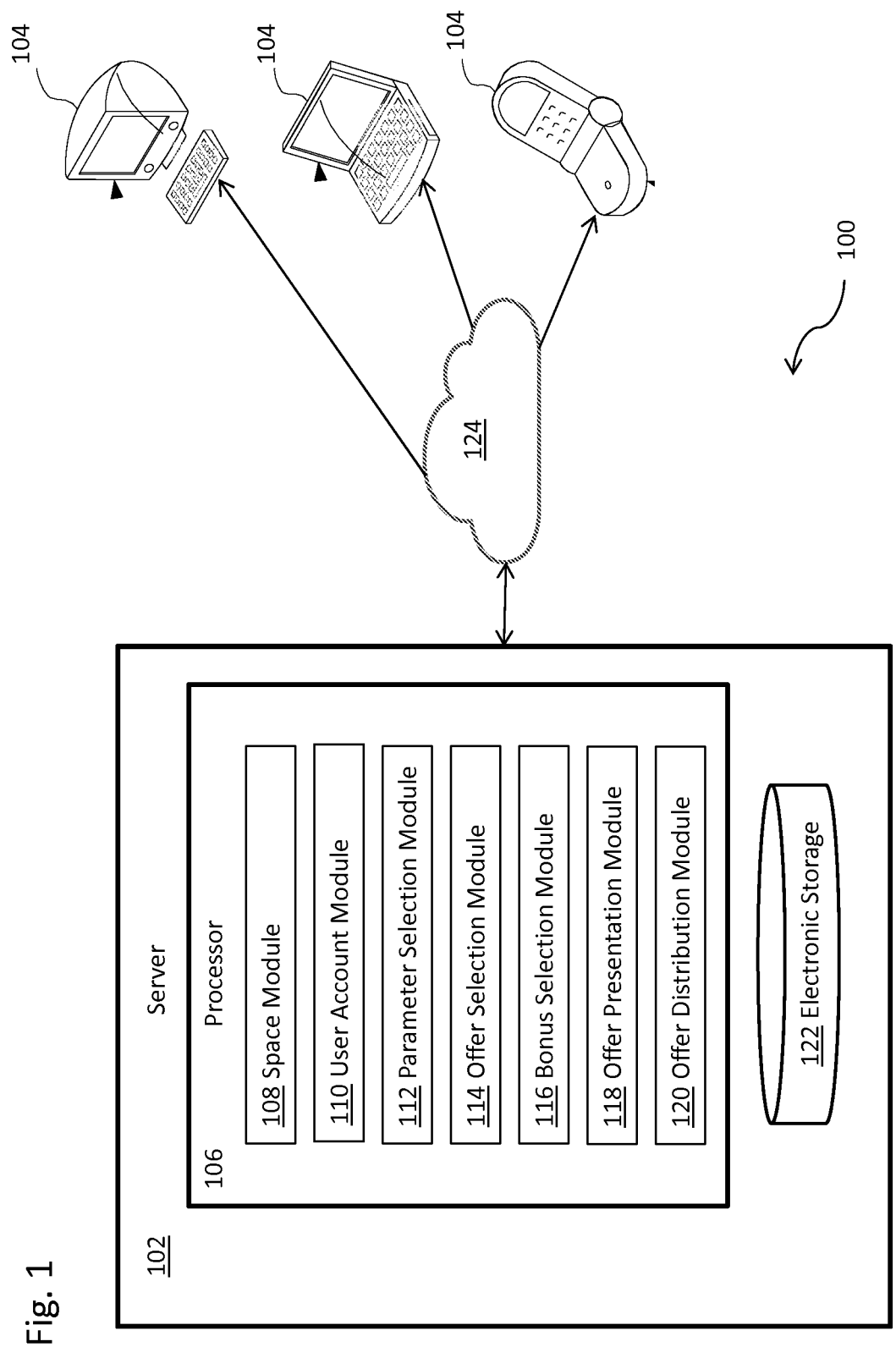
FIG. 1 illustrates an exemplary system configured to provide an in-game offer to one or more players of an online game.

FIG. 1 illustrates a system 100 configured to provide an in-game offer to one or more players of an online game based on one or more player parameters. The offer may be provided to players having one or more player parameters above or below a specified threshold. In some implementations, the offer may be meant to incentivize purchase of virtual currency and/or virtual items in the game. The in-game offer may comprise an offer to one or more virtual items and a bonus comprising one or more bonus items, which may be virtual items, provided to the player responsive to the offered items being purchased by the player. The in-game offer may only be made available to a qualifying player for a certain amount of time.

System 100 may be configured to provide the virtual space to the players over a network (e.g., network 124). Providing the virtual space may include hosting the virtual space over network 124. System 100 may be configured to provide a timed, in-game offer to one or more players of an online game. The offer is provided to players that have newly joined the game and/or to players that have not yet made a purchase. In some implementations, the offer may be meant to incentivize purchase upon entry into the game. The in-game offer may comprise an offer to one or more items and a bonus comprising one or more bonus items provided to the player responsive to the offered items being purchased. The in-game offer may only be made available to a qualifying player for a certain amount of time.

In some implementations, system 100 may include one or more servers 102. The server(s) 102 may be configured to communicate with one or more client computing platforms 104 according to a client/server architecture. One or more players may access system 100 and/or the virtual space via client computing platforms 104.

Server(s) 102 may be configured to execute one or more computer program modules. The computer program modules may include one or more of a space module 108, a user account module 110, a parameter selection module 112, an offer selection module 114, a bonus selection module 116, an offer presentation module 118, an offer distribution module 120, and/or other modules.

The space module 108 may be configured to implement the instance of the virtual space executed by the computer modules to determine a state of the virtual space. The state may then be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 108 is not intended to be limiting. The space module 108 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through space module 108).

The user account module 110 may be configured to manage accounts, profiles and/or user information of users. The accounts of users may include a first user account associated with a first user. The first user account may include an indication of one or more of a purchase history of the first user indicating purchases of virtual currency by the first user, a spend history of the first user indicating purchases using virtual currency by the first user, a first set of game parameters for first user, a first set of user parameters for the first user, or other parameters associated with the first user.

The one or more user profiles and/or user information may include information stored by server(s) 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information may include and/or indicate an activity level of the player. The activity level may include previous login time(s), previous logout time(s), login frequency, time spent logged in, and/or other activity information. The user information may also include information related to purchases in or for the virtual space. Such information may include, for example, activity information for individual transactions, a spend rate, a total spend amount, acceptance of offers and/or bonuses provided, and/or other information related to player purchases.

Within the virtual space, one or more users may participate in a game. The game may include a series of tasks that are performable by the one or more players within the virtual space. The game may include tasks in which players (or their entities) are adversaries, and/or tasks in which players (or their entities) are allies. The game may include tasks in which players (or their entities) are adversaries of non-player characters, and/or tasks in which players (or their entities) are allies of non-player characters. In the game, entities controlled by the player may obtain points, virtual currency or other virtual items, experience points, levels, and/or other demarcations indicating experience and/or success. Space module 108 may be configured to perform the functions associated with the game in executing the instance of the virtual space.

The parameter selection module 112 maybe configured to facilitate selection and/or entry by an administrator of one or more thresholds associated with one or more of a purchase history of the first user indicating purchases of virtual currency by the first user, a spend history of the first user indicating purchases using virtual currency by the first user, a first set of game parameters for first user, or a first set of user parameters for the first user. The parameter selection module 112 may be configured to facilitate entry and/or selection of one or more administrator defined parameters indicating a lower threshold for the amount of virtual currency purchased by the first user. The parameter selection module 112 may be configured to facilitate entry and/or selection of one or more administrator defined parameters indicating an upper threshold for a period of time since the first user purchased virtual currency. The parameter selection module 112 may be configured to facilitate entry and/or selection of one or more administrator defined parameters indicating an upper threshold for a period of time since the first user spent virtual currency. The parameter selection module 112 may be configured to facilitate entry and/or selection of one or more administrator defined parameters indicating an upper threshold for an amount of consideration having a value outside of the virtual space exchanged for virtual currency. The parameter selection module 112 may be configured to facilitate entry and/or selection of one or more administrator defined parameters indicating a threshold for the one or more game parameters of the first set of game parameters.

In some implementations, the first set of user parameters for the user may include user demographics. The one or more administrator defined parameters may include an indication that the user falls within specified ranges of individual ones of the user demographics. User demographics may include gender, age, location, weather, or any other identifying parameter for the user. One or more of the administrator defined parameters may comprise one or more user demographic information. In response to the first user having a first set of user parameters including user demographics corresponding to the one of more of the user demographic information included in the one or more administrator defined parameters. For example, the one or more administrator defined parameters may include an administrator defined location. The first user may have a first set of user parameters indicating that the first user is at the defined location.

The offer selection module 114 may be configured to select a first offer from a set of offers to present to the first user based upon one or more of the purchase history of the first user, the spend history of the first user, the first set of game parameters for the first user, or the first set of user parameters for the first user, wherein the first offer comprises an opportunity to purchase a first set of items. The first set of items may include virtual items usable in the virtual space, virtual currency, or other items available for purchase by the first user. In some implementations, the one or more items included in the offer may be items available for purchase by any user in the game. For example, the items may be items in a virtual marketplace or a virtual store associated with the game. In some implementations, the one or more items included in the offer may be a subset of items available for purchase in the game. For example, the first user may only receive an offer to purchase one or more items at a specific price point, geared towards a specific goal, related to a specific subject matter, and/or one or more items otherwise grouped.

In some implementations, the offer selection module 114 may segment players based on one or more player parameters, and may select a plurality of offers for a respective segment of players. For example, the offer selection module 114 may obtain values of respective player parameters for the players of the game. The offer selection module may form at least a first segment of players based on a value of a first parameter. The offer selection module 114 may generate a plurality of offers and a plurality of bonuses for the first segment. A first offer of the plurality of offers may comprise an opportunity to purchase a first set of items, where a second offer may comprise an opportunity to purchase a second set of items different from the first set.

The bonus selection module 116 may be configured to select a first bonus item from a set of bonus items to present to the first user with the first offer, wherein the first bonus item is usable in the virtual world. The first bonus item may include one or more items desirable to the first user to incentivize the first user to accept the first offer. The first bonus item may be one or more virtual items usable in the virtual space, virtual currency, a discount to the user cost associated with one or more items of the first offer, a desirable increase to one or more parameters of the user's in-game character, access to quests not normally available to the first user having parameters associated with the first user, or other item desirable to the first user. In some implementations, a first offer may comprise an opportunity to purchase one or more items and a first bonus may comprise at least one bonus item that may be provided to the first user responsive to the user purchasing the one or more offered items. In some implementations, a bonus may be associated with one or more specific offers, with any of the offers available, and/or with another grouping of offers. The one or more items included in the bonus may be items available in a virtual marketplace or virtual store associated with the game, items unavailable in the marketplace, a mix of unavailable and available items, and/or other items.

In some implementations, the one or more bonus items may comprise the one or more items available to include in the offer, experience points, virtual currency, instantiation of a buff, access to an area that was not previously accessible to the player, and/or other bonus items. In some implementations, the offer selection module 114 may reveal more information relating to the bonus as a time during which the offer and bonus are made available to the player decreases.

The first offer may comprise a user cost associated with the first set of items, wherein the user cost associated with the first set of items is independent from the first bonus item. In some implementations the first set of items may consist of a single virtual item.

The offer presentation module 118 may be configured to facilitate presentation of the first offer and the first bonus item to the first user, responsive to an indication that one or more of the purchase history of the first user, the spend history of the first user, or the first set of game parameters for the first user meets one or more of administrator defined parameters. An indication of the first offer may be provided to the first user. The indication of the first offer may be presented to the first user as a banner, pop-up window, or other indication, in the presentation of the view of the virtual space to the first user. In some implementations, an indication of the first offer may be provided to the first user in a game shop interface presented to the first user upon an interaction by the first user with the virtual space and/or the interface through which the user interacts with the virtual space. Other examples of the way in which the first user may receive an indication of the first offer may include, without limitation, electronic mail, notification through one or more electronic social networking sites affiliated with the first user, or other indications of the first offer.

The offer presentation module 118 may be configured to present offers to the first user in response to a determination that the first user is at the defined location specified by the administrator. The offer presentation module 118 may be further configured to provide such offers during a specified time, for example during a time period where peak gaming activity occurs for that location.

In some implementations an indication that the first offer has an associated bonus may be provided to the first user along with the presentation of the first offer. In other implementations the bonus associated with the first offer may be revealed to the first user after the first user has purchased the first offer.

In some implementations, the offer presentation module 118 may provide a bonus to the user along with the provision of an offer, but may not reveal to the user the items in the bonus. In some implementations, the offer presentation module 118 may reveal one or more of: the items in the bonus, a value in the game of each item in the bonus, a value in the game of the bonus as a whole, an availability of each item in the bonus in the game, and/or other information relating to the bonus. In some implementations, the offer presentation module 118 may reveal more information relating to the bonus as a time during which the offer and bonus are made available to the user decreases.

An administrator may have selected and/or entered an administrator defined parameter providing lower threshold for the amount of virtual currency purchased by the first user for use in the virtual space. The administrator defined parameter may provide a lower threshold for the amount of virtual currency purchased by the first user over a defined period of time. The purchase history of the first user may provide an indication that the user has purchased less virtual currency over a defined period of time than the lower threshold. In response to a determination that the purchase history of the first user indicates that the user has purchased less than the lower threshold, the offer presentation module 118 may present a first offer to the first user. Providing an offer to users who have purchased less than a lower threshold of virtual currency may incentivize those users to purchase virtual currency, thereby increasing the revenue generated from those users.

The one or more administrator defined parameters may include an upper threshold for the period of time since the first user purchased virtual currency. The purchase history of the first user may provide an indication that the user has not purchased virtual currency for the threshold period of time and in response, the offer presentation module 118 may present a first offer to the first user. Providing an offer to users who have not purchased virtual currency for a defined period of time may incentivize them to purchase virtual currency, increasing the revenue generated from those users.

The user account for the first user may comprise a first inventory for the first user providing an indication of the virtual items obtained by the first user in the virtual space. The inventory may provide an indication of the amount of virtual currency held in credit for the first user to spend in the virtual world. The inventory may provide an indication that the user has above a threshold amount of virtual currency held in credit. The spend history of the first user may provide an indication of the expenditures of virtual currency within the virtual space. Where the spend history of the first user indicates that the first user has not spent virtual currency for a defined period of time, and where the inventory for the first user provides an indication that the user has above a threshold amount of virtual currency held in credit for the first user, the offer presentation module 118 may provide a first offer to the first user. Providing offers to users who have an amount of virtual currency held in credit but remaining unspent may incentivize those users to spend their virtual currency. By spending their virtual currency on the offer, the users deplete their resources allowing them to be incentivized to purchase additional sums of virtual currency at a later date, thereby increasing the revenue generated from such users.

The one or more administrator defined parameters may comprise an upper threshold for the total amount of virtual currency obtained by the first user. The purchase history of the first user may indicate that the first user has obtained an amount of virtual currency above the upper threshold. In response to a determination that the first user has obtained an amount of virtual currency above the upper threshold, the offer presentation module 118 may be configured to present the first offer to the first user. Users who have purchased a relatively large amount of virtual currency compared to other users may be more likely to continue making purchases of virtual currency. By presenting offers to such users it may incentivize them to make further purchases of virtual currency and/or make purchases with virtual currency incentivizing them to replenish their virtual currency resources, thereby increasing the revenue generated from such users.

In some implementation, the first offer may have an associated time period during which the first offer is available to the first user. After expiration of the associated time period the first offer may no longer be available for selection and/or entry by the first user. The first user may be presented with no offer, or may be presented with a second offer. The second offer may have an associated time period during which the second offer is available to the first user.

The second offer may be associated with the same and/or different parameters for the first user, than those associated with the first offer.

The offer distribution module 120 may be configured to provide the first set of items associated with the first offer and the first bonus item to the first user, responsive to the first user selecting the first offer. Responsive to the first user selecting the first offer, the offer distribution module 120 may be configured to update the user inventory associated with the first user to indicate that the user has the first set of items and/or the first bonus item in the inventory associated with the first user. The offer distribution module 120 may be configured to provide the first set of items associated with the first offer and the first bonus item to the first user, responsive to the first user selecting the first offer and responsive to an indication that the first user has an amount of virtual currency the same as or in excess of the user cost associated with the first offer.

In some implementations the system may comprise a user selection module configured to determine whether a user qualifies for an offer. A user may qualify for an offer when the one or more of the purchase history of the first user, the spend history of the first user, or the first set of game parameters for the first user meets one or more of administrator defined parameters, meets one or more of the administrator selected and/or entered parameters, for example, as facilitated by the parameter selection module.

The offer selection module 114 may track the responses of the users of the first segment to the individual offers and bonuses provided to the respective players. In some implementations, a first subset of players of the first segment may have been provided the first offer and the first bonus, while a second subset of players of the first segment may have been provided the first offer and the second bonus. In these implementations, the offer selection module 114 may track the responses of the one or more players of the first subset to the first offer and the first bonus and the responses of one or more players of the second subset to the first offer and the second bonus. In some of these implementations, the offer selection module 114 may assess a relative effectiveness of the offers and bonuses transmitted to the first segment based on the responses of the players of the first segment. The assessment may include determining whether the provision of the first offer and the first bonus or the provision of the first offer and the second bonus is more effective for the first segment of players. In some implementations, the first subset may receive a first offer and a first bonus, while the second subset may receive a second offer and a second bonus.

In some implementations, the offer selection module 114 may be configured to select a second offer and a second bonus to provide to the player responsive to the player not accepting the first offer.

The offer selection module 114 may be configured to select a first offer and the bonus selection module 116 may be configured to select a first bonus for the first user responsive to the first user having one or more user parameters satisfying the one or more administrator defined parameters The offer presentation module 118 may make the offer available to the player for a specific amount of time. For example, the offer presentation module may make the offer available to the player for a predetermined amount of time, for an amount of time based on one or more characteristics of the player as obtained from a profile associated with the player, for an amount of time determined based on results of split testing of time frames for making available an offer and a bonus, and/or for other periods of time. In some implementations, a combination of an offer and a bonus may be associated with a respective predetermined amount of time.

In some implementations, responsive to the user not accepting the first offer and first bonus, the offer selection module 114 may select a plurality of offers for the first user. In some of these implementations, the offer selection module 114 may select offers but the bonus selection module 116 may select no bonus to associate with the first user. In some implementations, responsive to the first user not accepting the first offer, the offer selection module 114 may select a second offer and the bonus selection module 116 may select a second bonus for the first user. The offer presentation module 118 may provide an indication of the second offer with the second bonus to the first user for a predetermined amount of time, for an amount of time based on one or more characteristics of the first user as obtained from a user account associated with the first user, for an amount of time determined based on results of split testing time frames for making available a second offer and a second bonus, and/or for other periods of time. In some implementations, responsive to the first user not accepting the first offer and not accepting the second offer, the offer selection module 114 may select a plurality of offers for the first user and the offer presentation module 118 may provide an indication to the first user of one or more of those offers. In some of these implementations, the bonus selection module 116 may select no bonus to associate with the offer.

In some implementations an electronic storage media may store information related to providing an in-game offer to one or more players of an online game. The stored information may comprise a memory configured to store information related to the one or more players of an online game, and instructions to execute an instance of a virtual space; implement the instance of the virtual space to effectuate presentation of views of the virtual space to the one or more players by the one or more client computing platforms.

The plurality of offers and/or the plurality of bonuses may be specific to a user, specific to a group of user that share one or more characteristics, the same for all users, and/or otherwise customized to one or more users. For example, a first user may be presented with a first plurality of offers and a second player may be presented with a second plurality of offers different from the first plurality of offers. The numbers and types of items in each of the plurality of offers available may vary from user to user, may be the same for every player, may vary based on one or more characteristics associated with one or more user, and/or may vary in other ways as well. The numbers and types of items in each of the plurality of bonuses available may vary from user to user, may be the same for every user, may vary based on one or more characteristics associated with one or more users, and/or may vary in other ways as well. Storage 120 may store exemplary offers and bonuses available for one or more players. In some implementations, the offer selection module 114 may consult a storage (e.g., storage 120) to determine an offer and a bonus to provide to the player.

In some implementations, the offer selection module 114 may be configured to select a second offer and a second bonus to provide to the player responsive to the player not accepting the first offer. The offer selection module 114 may select a second offer and a second bonus to provide to the player in a manner the same or similar to the selection of the first offer and the first bonus. In some implementations, the offer selection module 114 may select the first offer to provide as the second offer and may select a second bonus different from the first bonus to provide along with the first offer. In some implementations, the offer selection module 114 may select a second offer different from the first offer and select the first bonus as the second bonus to provide along with the second offer. In some implementations, the second offer selected by the offer selection module 114 may be different from the first offer, and the second bonus may be different from the first bonus. In some implementations, the offer selection module 114 may consult a storage (e.g., storage 120) to determine the second offer and the second bonus to provide to the player.

In some implementations, the second offer may comprise fewer items than the first offer, may have items of lesser value than the items in the first offer, may have a purchase price that is lower than the first offer, and/or may have less value in the game than the first offer in other ways. The second bonus may comprise fewer items than the first bonus, may have items of lesser value than the items in the first bonus, and/or may have less value in the game than the first bonus in other ways. In some implementations, the second offer may comprise more items than the first offer, may have items of greater value than the items in the first offer, may have a purchase price that is higher than the first offer, and/or may have more value in the game than the first offer in other ways. The second bonus may comprise more items than the first bonus, may have items of greater value than the items in the first bonus, and/or may have more value in the game than the first bonus in other ways. In some implementations, a value of the first offer and the second offer in the game may be the same or similar, but the items and/or types of items in the first offer and the second offer may differ. A value of the first bonus and the second bonus in the game may be the same or similar, but the items and/or types of items in the first bonus and the second bonus may differ.

Offer presentation module 118 may provide an indication of an offer and an associated bonus to a user via one or more of in-game notification (e.g., a popup message in game, an icon on the player's screen, a flashing indicator, a marching icon, any combination thereof, and/or other in-game notifications), a text message (e.g., via SMS and/or other text message types), an email, a chat message, and instant messenger message, a mobile device alert, and/or other communication media. In some implementations, when offer presentation module 118 provides an indication of an offer and a bonus to the player, the offer presentation module 118 may also provide a timer that counts down the amount of time left for the player to accept the offer and bonus. When one or more specified amounts of time (e.g., 1 hour, 100 minutes, 1 minute, and/or other amounts of time) are left for the player to accept the offer and bonus provided, the offer presentation module 118 may provide a reminder to the user. The reminder may be provided via one or more of in-game notification (e.g., a popup message in game, an icon on the player's screen, a flashing indicator, a marching icon, any combination thereof, and/or other in-game notifications), a text message (e.g., via SMS and/or other text message types), an email, a chat message, and instant messenger message, a mobile device alert, and/or other communication media. The media for providing the offer and bonus may be dictated by the offer and bonus (e.g. as one of the variables), based on a player preference or setting, based on a determination as to whether the player is logged in to the virtual space and/or the game, and/or other information.

In some implementations, offer presentation module 118 may be configured to provide one or more reminders to the user after the initial provision of the offer and bonus is made. The timing and number of reminders may vary based on one or more variables include, for example, administrator settings, preferences based on the player profile, results of split testing, and/or based on other variables. A reminder may be provided in a manner the same or similar to the provision of the offer and bonus.

The reporting module 118 may be configured to provide and/or display one or more reports based on information related to the online game, information stored at storage 120, and/or other information related to system 100. For example, the reporting module 118 may be configured to facilitate analysis and report information related to system usage, player activity, award management, and/or other stored information. The reporting module 118 may be configured to produce statistics regarding the stored information and may be configured to prepare and/or display reports including one or more parts of the stored information. For example, the reporting module 118 may be configured to prepare and or display one or more reports including information related to the provision of offers and bonuses to one or more players, the time frames during which the offers and bonuses were made available, the number and types of items in a first offer made available, the number and types of items in a first bonus made available to one or more players, the numbers and types of items in a second offer made available, the numbers and types of items in a second bonus made available to one or more players, a time at which the provision of the offers and bonuses were made available, methods by which the provision of the offers and bonuses were made available, the bonuses associated with one or more offers made available to the one or more players, and/or other types of reports.

In some implementations, the reporting module 118 may be configured to display one or more reports to a player via a player interface. In some implementations, the player interface may be accessed via various channels such as, for example, a webpage, a web portal, an agent (such as a software and/or hardware module) executing on server 102, electronic mail and/or other communication channels that can be used to present the comparisons to a player. In some implementations, the system 100 may present a link to a display of one or more reports prepared by the reporting module 118.

Figure 2:
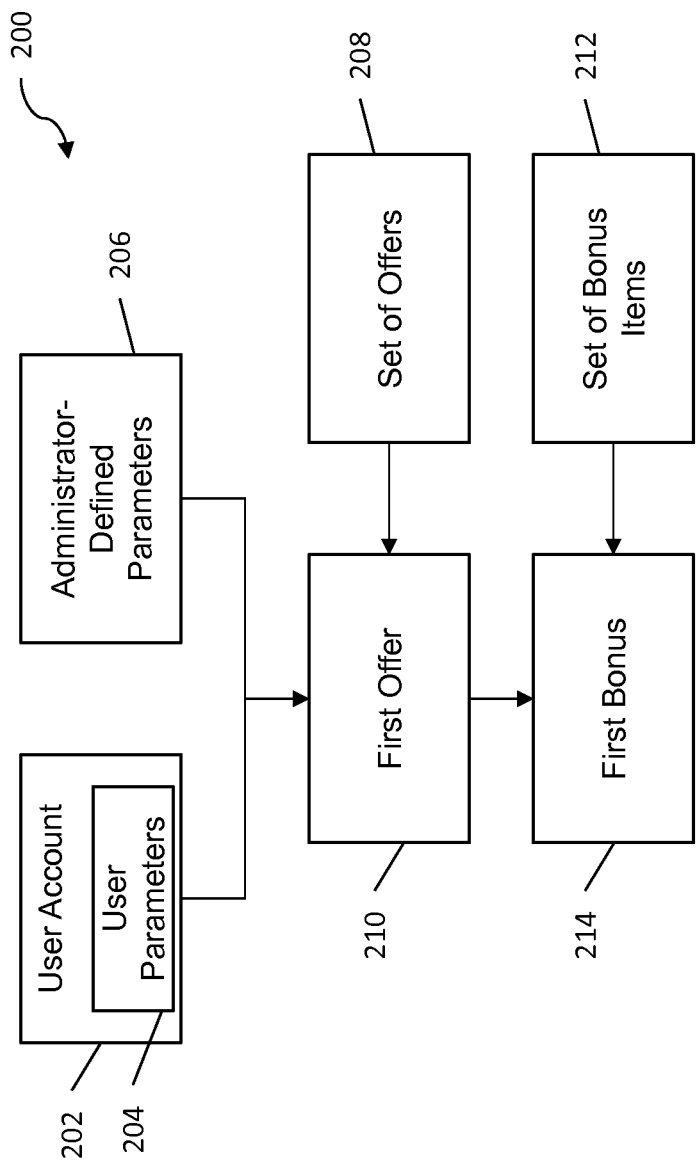
FIG. 2 graphically illustrates selecting and distributing one or more offers and bonus items to users of a game, according to one or more implementations.

FIG. 2 graphically illustrates selecting and distributing one or more offers and bonus items to users of a game, according to one or more implementations. As previously discussed, the system 100 may comprise a user account module 110 (as shown in FIG. 1) configured to manage one or more user accounts 202. The one or more user accounts 202 may comprise a first user account associated with the first user. The first user account may comprise one or more user parameters 204. The one or more user parameters 204, may include one or more of demographic parameters, social media parameters, game parameters, activity parameters, purchase history of the user indicating purchases of virtual currency by the user, spend history of the user indicating purchases using virtual currency by the user.

One or more administrator defined parameters 206 may be provided. The one or more administrator defined parameters 206 may be provided by an administrator, the selection and/or entry of which may be facilitated by a parameter selection module, such as parameter selection module 112 (as shown in FIG. 1). The one or more administrator defined parameters 206 may include administrator defined thresholds for one or more of demographic parameters, social media parameters, game parameters, activity parameters, purchase history of the users indicating purchases of virtual currency by the users, spend history of the users indicating purchases using virtual currency by the users.

Examples of administrator defined parameters 206 may include, but not be limited to, one or more of the domain or server upon which the user is playing the game, the age range of the user, an achievement level range for the user. The one or more administrator defined parameters 206 may also include, but not be limited to, in-game content related parameters, such as the building level of the user, the number of troops of the user, the research level of the user, the number of cities possessed by the user in the virtual space, the number of scouts, the number of transports, the number of reinforcements available to the user, the number of wins by the user, the number of attacks by the user against other users and/or non-player characters or elements, the number of losses, and other in-game parameters. Other parameters 1106 defined by administrators may be the last time user accessed the game, given in a time range, such as a range of days or weeks, whether the user has been previously presented with an offer, whether the user has accepted one or more previously presented offers, or other administrator defined parameters 206.

The offer selection module 114 (as shown in FIG. 1) may be configured to receive and/or obtain, the one or more user parameters 204 in the user account 202 of the first user, receive the one or more administrator defined parameters 206, and one or more sets of offers 208 and to select a first offer 210 for the first user or first group or segment of users. The offer selection module 114 may be configured to select the first offer 210 based upon an indication and/or determination that the first user has one or more user parameters 204 which fall within and/or match the one or more administrator defined ranges 206 for the parameters.

The bonus selection module 116 (as shown in FIG. 1) may be configured to receive and/or access, the one or more user parameters 204 in the user account 1102 of the first user, receive the one or more administrator defined parameters 1106, and one or more sets of bonus items 212 and to select a first bonus item 214 for the first user or first group of users. The bonus selection module 116 may be configured to select a first bonus item 214 from the one or more sets of bonus items 212 based upon the one or more user parameters 204 and/or administrator-defined parameters 1106.

In some implementations, the users may be segmented based upon one or more user parameters. The offer selection module 114 may select a plurality of offers and the bonus selection module 116 may select a plurality of bonus items for each of the segments of users.

The offer selection module 114 may track the responses of the players of a first segment to the individual offers and bonuses provided to the respective players. In some implementations, a first subset of users of the first segment may have been provided a first offer and a first bonus, while a second subset of players of the first segment may have been provided the first offer and a second bonus. In these implementations, the responses of the one or more players of the first subset to the first offer and the first bonus and the responses of one or more players of the second subset to the first offer and the second bonus may be tracked by one or more modules of the system 100. In some of these implementations, a relative effectiveness of the offers and bonuses provided to the first segment based on the responses of the players of the first segment may be assessed by one or more modules of the system 100. The assessment may include determining whether the provision of the first offer and the first bonus or the provision of the first offer and the second bonus is more effective for the first segment of players. In some implementations, the first subset may receive a first offer and a first bonus, while the second subset may receive a second offer and a second bonus.

Offer selection module 114 may be configured to select offers and the bonus selection module 116 may select bonuses based on their determined effectiveness in incentivizing users to select the offer in exchange for virtual currency. For example, responsive to a determination that the first offer and first bonus is more effective for the first segment than the second offer and second bonus for the first segment, offer selection module 114 may select the first offer and the bonus selection module 116 may select the first for the first segment.

Demographic parameters may include a parameter related to the real world demographics of the players. For example, a demographic parameter may include one or more of age, gender, geographic location, language, income, education level, career, marital status, and/or other demographic parameters. Parameter module 122 may be configured to obtain values of demographic parameters based on registration information provided by the player to system 100 (e.g., upon opening an account to participate in the virtual space and/or the game), information received from an online platform from which the virtual space is accessed (e.g., via a social network website, a microblogging service, and/or other online platforms), information derived or deduced from one or more other player parameters (e.g., determined from a usage parameter, from a social parameter, and/or other parameter), and/or from other information or sources.

A social media parameter may include a parameter related to a social network and/or the manner and/or individuals with which a player socializes in and/or out of the virtual space. By way of non-limiting example, a social parameter may include one or more of a parameter derived from a social graph in a social network service, an in-game relationship, a social platform from which the virtual space is accessed, and/or other social parameters. The offer selection module 114 may be configured to select a first offer based upon the values of social parameters from relationships established within the virtual space (e.g., friendships, alliances, and/or other relationships), information received from an online platform from which the virtual space is accessed, information related to the usage of the virtual space (e.g., other users with whom a first player participates in the virtual space and/or the game, other players with whom a first player communicates in the virtual space, and/or other information related to usage), and/or from other information or sources.

A game parameter may include a parameter related to participation and/or usage of the player in the game and/or the virtual space. By way of non-limiting example, a game parameter may include one or more of an entity class, an entity faction, a usage amount, one or more usage times, a level, inventory in the virtual space, a score, and/or other parameters. The offer selection module 114 may be configured to select a first offer, and the bonus selection module 116 may be configured to select a first bonus item, based upon values of the game parameters by monitoring user interaction with the virtual space. This may include monitoring interactions of users and/or the entities they control in the instance of the virtual space executed space module 106, and/or monitoring other interactions.

An activity parameter may be related to an activity history of the player in the virtual space. By way of non-limiting example, an activity history may include one or more of activity level of the player, virtual currency account information of the player, relationship information of the player, virtual space usage information of the player, interaction history of the player, browsing history of the player, purchase history and/or other activity history. An activity parameter may also include one or more of an average participation time in a session of the player, an average time in a session after the player experiences an event, an average time between sessions of the game, a value metric representing the value of the player, an amount of time spent in the game by the player since joining the game, an amount of time since the last login of the player, an average amount of time at a level in the game, an average amount of time involved in a specific action, a spend velocity, and/or other activity parameters. An event may include, for example, joining an alliance, losing status, losing money, getting lost in the virtual game, losing a friendship, gaining a friendship, losing an alliance, receiving an offer for a virtual item, purchasing a virtual item, changing a player entity, changing a view of the game, engaging in activity with another player, entering a new level of the game, engaging in a training session, engaging in an in-game experience separate from the game, and/or other events. A purchase history may include information relating to, for example, player purchases, player sales, player exchanges, player browsing for potential virtual items for purchase, and/or other purchase events. A purchase may include a transaction in which real world currency is exchanged for one or more virtual items, a transaction in which one or more virtual items (e.g., virtual currency) is exchanged for another one or more virtual items, and/or other transactions in which one or more virtual items are received or given by a player.

The offer selection module 116 may be configured to select offers based upon segments the users having one or more of the parameters for which values are obtained, including, but not limited to, demographic, social media, game, activity parameters, and other parameters. For example, a first segment of players may be formed based on values of a first parameter. The first segment may include some portion of the overall players having values of the first parameter that correspond to each other. This may include values that are the same, values that are equal, values that fall within a specified range, values that are at least as adjacent as a threshold of some adjacency metric, and/or other values that correspond to each other. The use of an exemplary segment formed based on a single parameter is not intended to be limiting. The scope of this disclosure extends to implementations in which the first segment is formed on the first parameter, and on one or more other parameters.

In some implementations, users may have similar tendencies. The offer selection module 114 and the bonus selection module 116 may be configured to select a first offer and a first bonus item, respectively, based upon user tendencies. For example, a segment of users may have similar activity tendencies, similar usage tendencies, similar responses to offers, similar responses to bonuses, and/or other tendencies in common.

The offers within a set of offers may differ by one or more variables. The variables of an offer may include one or more of the items included, a purchase price of the one or more items included, the types of items included, the timing by which the items (when purchased) may be made available to the player, the method of the provision, and/or other variables. The bonuses within a set of bonuses may differ by one or more variables. The variables of a bonus may include one or more of the items included, a value of the one or more items included (e.g., a purchase price if the player is able to purchase the item), the types of items included, the timing by which the items may be made available to the player, the method of the provision, and/or other variables.

Offer distribution module 120 may be configured to distribute offers and bonuses to users in response to the users selecting the offer. This may include adding the items in the offer and bonus in a virtual inventory of the user, deducting a specific amount of virtual currency from an account of the user, taking consideration for the purchase of the item from the user, and/or other redemptions. In some implementations, offer distribution module 120 may facilitate the sharing or transfer, by the user, of the offer, the bonus, portions of the offer, portions of the bonus, and/or other parts of the offer and bonus. In some implementations, responsive to the user accepting an offer and a bonus, the distribution module 120 may also be configured to transmit a congratulatory message and/or other indication of redemption to the user.

The responses of users to indications of the individual offers and bonuses generated by offer selection module 114 may be tracked. This may include determining a time spent viewing an offer and bonus, determining whether a user viewed an offer and bonus, determining a time spent viewing a reminder related to an offer and bonus, determining a time spent looking at other items available to the user during a time period in which the offer and bonus were made available to the user, determining whether a user accepted an offer and bonus, determining how quickly a user accepted an offer and a bonus, determining how many offers and bonuses were provided to the player before the user accepted an offer and a bonus, and/or other tracking activities. By way of example, responsive to the provision of the first offer and a first bonus to a first subset of players in the first segment, and to the provision of the second offer and the second bonus to a second subset of players in the first segment, tracking module 40 may track the responses of the first subset of users to the first offer and the first bonus and/or may track the responses of the second subset of players to the second offer and the second bonus.

The relative effectiveness of offers and bonuses transmitted to the segments of users based on the responses of the users may be assessed. This may include determining, for individual sets of offers and bonuses, a most effective offer and bonus combination in a set of offers and bonuses, a least effective offer and bonus in a set of offers and bonuses, a relative ranking of offers and bonuses in a set of offers and bonuses, and/or other determinations related to the relative effectiveness of the offers and bonuses in an individual set of offers and bonuses. Such determinations may be made based on the responses of the users as tracked by tracking module 40. The determination that the first offer and the first bonus is more effective than the second offer and second bonus may be made responsive to some threshold number of provisions of the first offer and the first bonus and/or the second offer and second bonus (alone or combined) being made, a level of difference in effectiveness between the first offer and the first bonus and the second offer and second bonus breaching a threshold, a level of effectiveness of the second offer and second bonus falling below a threshold level, and/or other events.

Server 102 and/or client computing platforms 104 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 102 and/or client computing platforms 104 may be operatively linked via some other communication media.

A given client computing platform 104 may include one or more processors configured to execute computer program modules. The computer program modules may be configured to enable an expert or player associated with the given client computing platform 104 to interface with server 102, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server 102 may include electronic storage 120, one or more processors 106, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 120 may comprise electronic storage media that electronically stores information non-transiently. The electronic storage media of electronic storage 120 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor 106, information received from server 102, information received from client computing platforms 104, and/or other information that enables server 102 to function as described herein.

Processor(s) 106 may provide information processing capabilities within server 102. As such, processor 106 may include one or more of a digital processor, an analog processor, a digital circuit designed to process information, an analog circuit designed to process information, a state machine, and/or other mechanisms for electronically processing information. Although processor 106 is shown in FIG. 1 as a single entity, this is not intended to be limiting, as processor 106 may include a plurality of processors operating in coordination or cooperation. This may include implementations in which server 72 includes a multi-processor device, a farm of server devices operating together, and/or virtual resources provided by the cloud. The processor 106 may be configured to execute modules 108, 110, 112, 114, 116, 118 and/or 120. Processor 106 may be configured to execute modules 106, 108, 110, 112, 114, 116, 118 and/or 120 by software; hardware; firmware; some combination of software, hardware, and/or firmware; and/or other mechanisms for configuring processing capabilities on processor 106.

It should be appreciated that although modules 106, 108, 110, 112, 114, 116, 118 and/or 120 are illustrated in FIG. 1 as being co-located within a single processing unit, in implementations in which processor 106 includes multiple processing units, one or more of modules 106, 108, 110, 112, 114, 116, 118 and/or 120 may be located remotely from the other modules. The description of the functionality provided by the different modules 106, 108, 110, 112, 114, 116, 118 and/or 120 described below is for illustrative purposes, and is not intended to be limiting, as any of modules 106, 108, 110, 112, 114, 116, 118 and/or 120 may provide more or less functionality than is described. For example, one or more of modules 106, 108, 110, 112, 114, 116, 118 and/or 120 may be eliminated, and some or all of its functionality may be provided by other ones of modules 106, 108, 110, 112, 114, 116, 118 and/or 120. As another example, processor 106 may be configured to execute one or more additional modules that may perform some or all of the functionality attributed below to one of modules 106, 108, 110, 112, 114, 116, 118 and/or 120.

Figure 3:
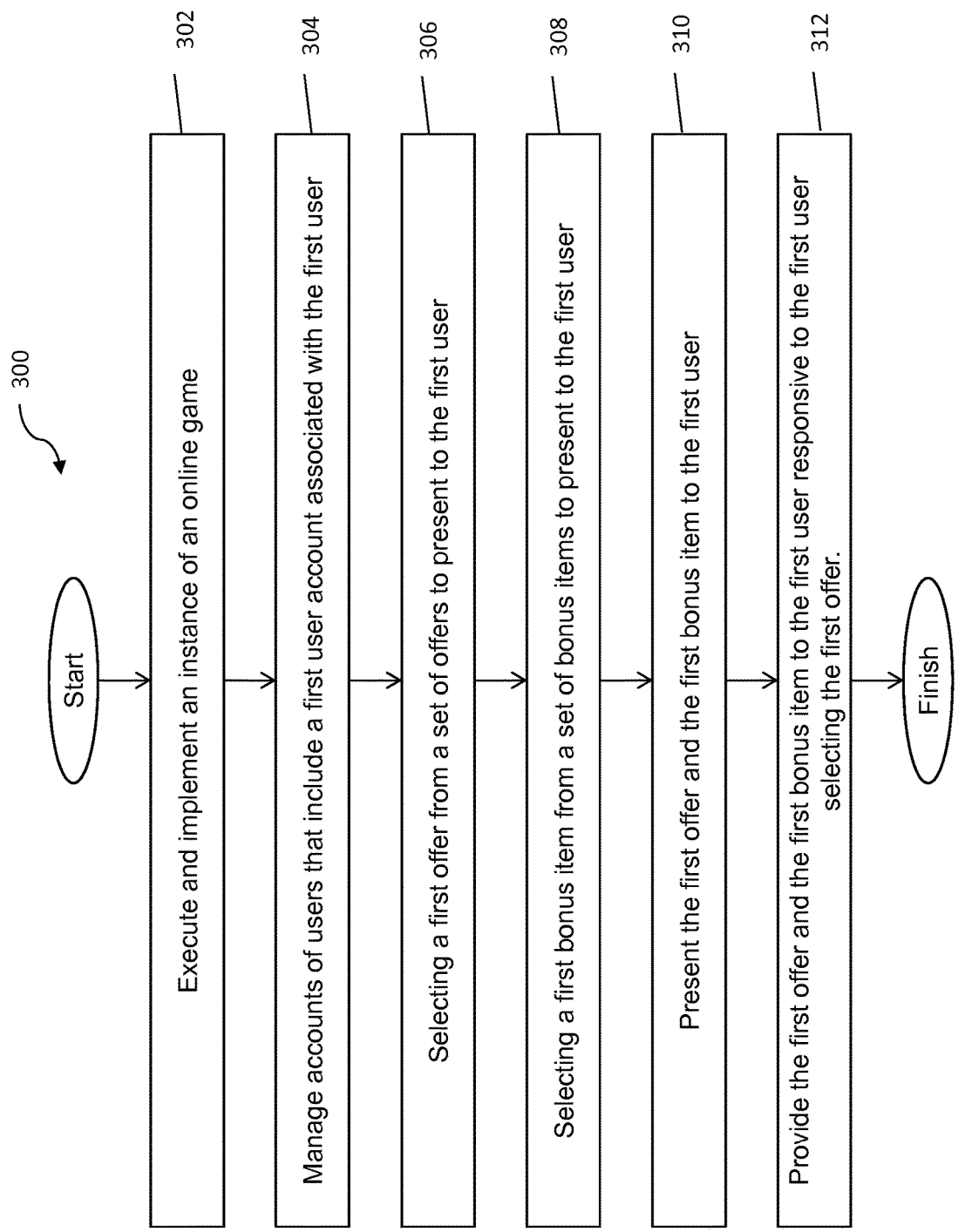
FIG. 3 illustrates an exemplary method of providing an in-game offer to one or more players of an online game.

FIG. 3 illustrates a method 300 of providing an in-game offer to one or more players of an online game. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed. At an operation 302, the instance of the virtual space may be implemented to facilitate presentation of the view of the virtual space to users. In some implementations, operation 302 may be performed by a space module the same as or similar to space module 108 (shown in FIG. 1 and described above).

At an operation 304, accounts of the users may be managed. The accounts of the users may include a first user account associated with a first user, wherein the first user account indicates a purchase history of the first user indicating purchases of virtual currency by the first user, a spend history of the first user indicating purchases using virtual currency by the first user, a first set of game parameters for first user, and a first set of user parameters for the first user. In some implementations, operation 304 may be performed by a user account module the same as or similar to user account module 110 (shown in FIG. 1 and described above).

At an operation 306, an offer may be selected to present to a first user. The first offer may be selected from a set of offers, wherein the first offer is to be presented to the first user based upon one or more of the purchase history of the first user, the spend history of the first user, the first set of game parameters for the first user, or the first set of user parameters for the first user. The first offer may comprise an opportunity to purchase a first set of items. In some implementations, operation 306 may be performed by an offer selection module 114 the same as or similar to offer selection module 114 (shown in FIG. 1 and described above).

The first offer may comprise a user cost associated with the first set of items, wherein the user cost associated with the first set of items is independent from the first bonus item. The first set of items may consist of a single virtual item or may consist of multiple virtual items. Where the first set of items consists of multiple virtual items, the first set of items may comprise multiples of a single type of virtual item, or may comprise multiple virtual items of different types. In some implementations the first offer may have an associated time period wherein the first offer is available to the first user.

At an operation 308 a first bonus item may be selected from a set of bonus items to present to the first user with the first offer, wherein the first bonus item is usable in the virtual world. In some implementations, operation 308 may be performed by a bonus selection module 116 the same as or similar to bonus selection module 116 (shown in FIG. 1 and described above).

At an operation 310, the first offer and the first bonus item may be presented to the first user, responsive to an indication that one or more of the purchase history of the first user, the spend history of the first user, or the first set of game parameters for the first user meets one or more administrator defined parameters. In some implementations, operation 310 may be performed by offer presentation module 118 the same as or similar to offer presentation module 118 (shown in FIG. 1 and described above).

The one or more administrator defined parameters may include an indication that the user has purchased an amount of virtual currency below a specified threshold. The one or more administrator defined parameters may include an indication that a specified period of time has transpired since the first user purchased virtual currency. The one or more administrator defined parameters may include an indication that a specified period of time has transpired since the first user spent virtual currency. The one or more administrator defined parameters may include an indication that the first user has spent above a specified amount of real currency to purchase virtual currency. The one or more administrator defined parameters may include an indication that one or more game parameters of the first set of game parameters has breached a specified threshold.

In some implementations the first set of user characteristics for the first user may include user demographics, and the one or more administrator defined parameters may include an indication that the user falls within specified ranges of individual ones of the user demographics.

At an operation 312, the first offer and the first bonus item may be provided to the first user responsive to the first user selecting the first offer. In some implementations, operation 312 may be performed by an offer distribution module 120 the same as or similar to offer distribution module 120 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of providing an in-game offer to one or more users of an online game, the method being implemented in a computer system comprising one or more physical processors, the method comprising:
    executing an instance of a virtual space;
    implementing the instance of the virtual space to facilitate presentation of a view of the virtual space to users;
    managing accounts of users that include a first user account associated with a first user, wherein the first user account indicates a purchase history of the first user indicating purchases of virtual currency by the first user, a spend history of the first user indicating purchases using virtual currency by the first user, a first set of game parameters for the first user, and a first set of user parameters for the first user;
    making a determination whether the first user account indicates that
        (i) a specified period of time has transpired since the first user purchased virtual currency, and/or
        (ii) a specified period of time has transpired since the first user spent virtual currency
    selecting, responsive to the determination being positive, a first offer from a set of offers to present to the first user, wherein the first offer comprises an opportunity to purchase a first set of items;
    selecting, responsive to the determination being positive, a first bonus item from a set of bonus items to present to the first user with the first offer, wherein the first bonus item is usable in the virtual world;
    presenting, responsive to the determination being positive, the first offer and the first bonus item to the first user;
    receiving, from a first client computing platform associated with the first user, information that confirms acceptance of the first offer; and
    providing, responsive to receiving the information from the first client computing platform, the first set of items and the first bonus item to the first user.

2. The method of claim 1, wherein the first offer comprises a user cost associated with the first set of items, wherein the user cost associated with the first set of items is independent from the first bonus item.

3. The method of claim 1, wherein the first set of items consists of a single virtual item.

4. The method of claim 1, wherein a first set of user characteristics for the first user includes user demographics, and wherein presenting the first offer and the first bonus item is further responsive to a determination that the first user falls within specified ranges of individual ones of the user demographics.

5. The method of claim 1, wherein the first offer has an associated time period wherein the first offer is available to the first user.

6. A system configured to provide an in-game offer to one or more users of an online game, the system comprising:
    one or more processors configured by machine-readable instructions to:
        execute an instance of a virtual space, and to implement the instance of the virtual space to facilitate presentation of a view of the virtual space to users;
        manage accounts of users, wherein the accounts of users include a first user account associated with a first user, wherein the first user account indicates a purchase history of the first user indicating purchases of virtual currency by the first user, a spend history of the first user indicating purchases using virtual currency by the first user, a first set of game parameters for the first user, or a first set of user parameters for the first user;
        make a determination whether the first user account indicates that
            (i) a specified period of time has transpired since the first user purchased virtual currency, and/or
            (ii) a specified period of time has transpired since the first user spent virtual currency
        select, responsive to the determination being positive, a first offer from a set of offers to present to the first user, wherein the first offer comprises an opportunity to purchase a first set of items;
        select, responsive to the determination being positive, a first bonus item from a set of bonus items to present to the first user with the first offer, wherein the first bonus item is usable in the virtual world
        facilitate presentation, responsive to the determination being positive, the first offer and the first bonus item to the first user;
        receive, from a first client computing platform associated with the first user, information that confirms acceptance of the first offer; and
        provide, responsive to receiving the information from the first client computing platform, the first set of items associated with the first offer and the first bonus item to the first user.

7. The system of claim 6, wherein the first offer comprises a user cost associated with the first set of items, wherein the user cost associated with the first set of items is independent from the first bonus item.

8. The system of claim 6, wherein the first set of items consists of a single virtual item.

9. The system of claim 6, wherein a first set of user characteristics for the first user includes user demographics, and wherein presentation of the first offer and the first bonus item is further responsive to a determination that the first user falls within specified ranges of individual ones of the user demographics.

10. The system of claim 6, wherein the first offer has an associated time period wherein the first offer is available to the first user.

\* \* \* \* \*